(12) United States Patent
Juliato et al.

(10) Patent No.: US 11,201,878 B2
(45) Date of Patent: Dec. 14, 2021

(54) BUS-OFF ATTACK PREVENTION CIRCUIT

(71) Applicant: Intel Corporation, Santa Clara, CA (US)

(72) Inventors: Marcio Rogerio Juliato, Portland, OR (US); Shabbir Ahmed, Beaverton, OR (US); Santosh Ghosh, Hillsboro, OR (US); Christopher Gutierrez, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 16/402,535

(22) Filed: May 3, 2019

(65) Prior Publication Data

US 2019/0260772 A1 Aug. 22, 2019

Related U.S. Application Data

(60) Provisional application No. 62/760,726, filed on Nov. 13, 2018.

(51) Int. Cl.
*H04L 29/06* (2006.01)
*H04L 12/40* (2006.01)

(52) U.S. Cl.
CPC .......... *H04L 63/1416* (2013.01); *H04L 12/40* (2013.01); *H04L 12/40136* (2013.01); *H04L 63/1466* (2013.01); *H04L 2012/40215* (2013.01)

(58) Field of Classification Search
CPC ............. H04L 63/1416; H04L 63/1441; H04L 63/1425; H04L 63/1408; H04L 63/1466; H04L 63/123; H04L 2463/141; H04L 2463/146; H04L 63/0254
USPC ......................................................... 726/23
See application file for complete search history.

(56) References Cited

U.S. PATENT DOCUMENTS

| 9,100,427 | B2* | 8/2015 | Dubrovsky | H04L 63/1416 |
| 9,729,509 | B2* | 8/2017 | Jain | H04L 63/1458 |
| 2003/0145236 | A1* | 7/2003 | Tateoka | H04L 67/1002 726/12 |
| 2004/0111640 | A1* | 6/2004 | Baum | H04L 63/1408 726/13 |
| 2006/0182187 | A1* | 8/2006 | Likovich, Jr. | H04L 1/242 375/257 |

(Continued)

OTHER PUBLICATIONS

"FlexRay Communications System Protocol Specification Version 3.0.1", Flex Ray, (Oct. 2010), 341 pgs.

(Continued)

*Primary Examiner* — Badri Narayanan Champakesan
(74) *Attorney, Agent, or Firm* — Schwegman Lundberg & Woessner, P.A.

(57) ABSTRACT

Various systems and methods for bus-off attack detection are described herein. An electronic device for bus-off attack detection and prevention includes bus-off prevention circuitry coupled to a protected node on a bus, the bus-off prevention circuitry to: detect a transmitted message from the protected node to the bus; detect a bit mismatch of the transmitted message on the bus; suspend further transmissions from the protected node while the bus is analyzed; determine whether the bit mismatch represents a bus fault or an active attack against the protected node; and signal the protected node indicating whether a fault has occurred.

23 Claims, 9 Drawing Sheets

(56) References Cited

U.S. PATENT DOCUMENTS

| | | | | |
|---|---|---|---|---|
| 2008/0091857 | A1* | 4/2008 | McDaniel | H04L 63/123 710/72 |
| 2008/0186870 | A1* | 8/2008 | Butts | H04L 43/0847 370/252 |
| 2009/0182991 | A1* | 7/2009 | Quach | G06F 9/3851 712/222 |
| 2009/0210123 | A1* | 8/2009 | Baldet | F16H 61/08 701/66 |
| 2009/0307549 | A1* | 12/2009 | Choate | G01R 31/31703 714/732 |
| 2013/0227648 | A1* | 8/2013 | Ricci | G06F 11/0748 726/3 |
| 2015/0033019 | A1* | 1/2015 | Oguma | H04L 9/0822 713/171 |
| 2015/0033322 | A1* | 1/2015 | Wang | H04L 63/0254 726/13 |
| 2016/0301707 | A1* | 10/2016 | Cheng | H04L 67/303 |
| 2016/0381068 | A1* | 12/2016 | Galula | B60R 16/0232 726/23 |
| 2017/0013005 | A1* | 1/2017 | Galula | H04L 63/20 |
| 2017/0109521 | A1* | 4/2017 | Ujiie | B60R 16/0231 |
| 2017/0149785 | A1* | 5/2017 | Kurian | H04L 63/1425 |
| 2017/0171159 | A1* | 6/2017 | Kumar | H04L 63/0281 |
| 2017/0195878 | A1* | 7/2017 | Takemori | H04L 63/0428 |
| 2018/0091533 | A1* | 3/2018 | Yajima | H04L 63/1416 |
| 2018/0167216 | A1* | 6/2018 | Walrant | H04W 12/069 |
| 2019/0052654 | A1* | 2/2019 | Juliato | G06F 21/64 |
| 2020/0213351 | A1* | 7/2020 | Shin | H04L 12/40 |
| 2020/0389433 | A1* | 12/2020 | Zivic | H04L 63/0227 |
| 2021/0026955 | A1* | 1/2021 | Juliato | G06F 21/71 |
| 2021/0105292 | A1* | 4/2021 | Hamada | H04L 9/004 |

OTHER PUBLICATIONS

"Can Specification Version 2.0", Bosch, (Apr. 5, 1995), 72 pgs.

"LIN Specification Package", Revision 2.2A LIN Consortium, (Dec. 31, 2010), 194 pgs.

Cho, Kyong-Tak, "Error Handling of In-vehicle Networks Makes Them Vulnerable", Proceedings of the 2016 ACM SIGSAC Conference on Computer and Communications Security CCS '16, (2016), 12 pgs.

* cited by examiner

US 11,201,878 B2

BUS-OFF ATTACK PREVENTION CIRCUIT

PRIORITY APPLICATION

This application claims the benefit of priority to U.S. Provisional Application Ser. No. 62/760,726, filed Nov. 13, 2018, which is incorporated herein by reference in its entirety.

TECHNICAL FIELD

Embodiments described herein generally relate to automotive security systems, and in particular, to systems and methods for detecting and preventing a bus-off attack.

BACKGROUND

Automotive systems have become increasingly computerized in recent years. Various attacks have been demonstrated on such automotive systems, which aim to disable, overtake, or reprogram portions of an automotive component. One form of attack is referred to as a "bus-off" attack. An electronic component targeted in a bus-off attack is tricked into various error states, which may eventually cause the targeted component to remove itself from the communication bus.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
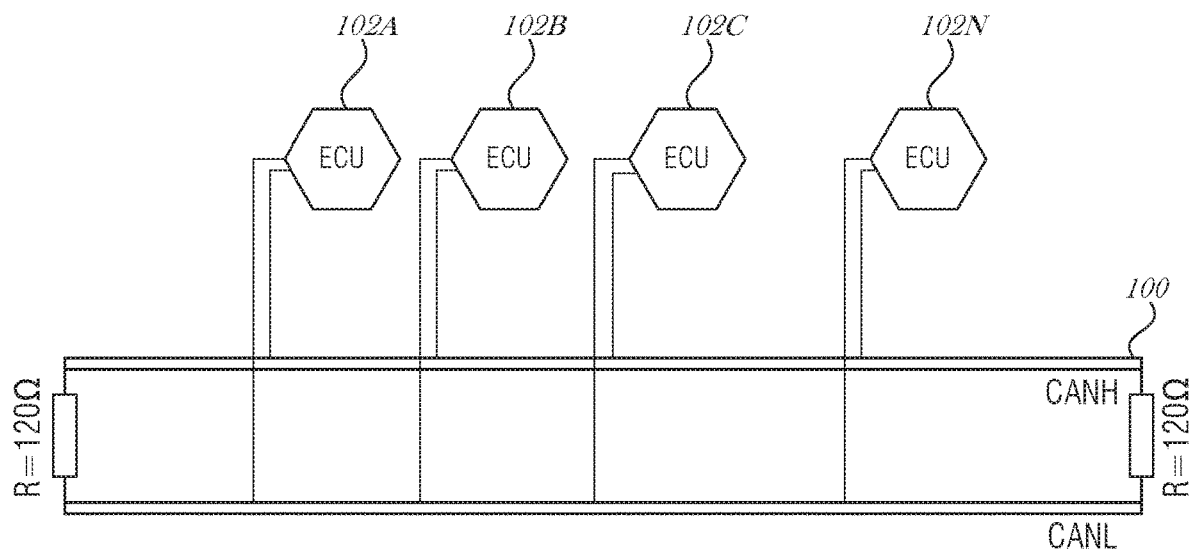
FIG. 1 is a diagram illustrating a Controller Area Network (CAN) bus, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Networks utilized in mission-critical systems (e.g., automotive networks Local Interconnect Network (LIN), FlexRay, and Controller Area Network (CAN)) have traditionally built-in fault handling mechanisms, which constantly check for faults in transmission and reception of packages. These mechanisms were exclusively designed for fault containment. Nodes with persistent transmission/reception faults progress through a degradation model (error states), eventually reaching a full disconnection from the bus to prevent disturbance to the remaining parts of the system. Depending on the network, this ultimate error state is called limp mode, halt, or bus-off state.

Recently, this fault containment feature has been exploited to perform malicious actions against in-vehicle networks. These attacks are referred to as bus-off attacks, in which the attacker causes transmission collisions in the bus, hence causing fully functional nodes to accumulate errors. As a consequence, authentic nodes are deceived into believing that they are defective, ultimately disconnecting from the bus. The underlying issue is the inability to differentiate between attacks and authentic faults.

One common automotive in-vehicle network is the CAN bus. The CAN bus is used to connect various systems together in a vehicle, such as the engine control unit, transmission, airbags, antilock braking system (ABS), cruise control, power steering, audio systems, power windows, collision avoidance systems, etc.

Automotive CAN buses are implemented as a twisted pair of wires with ECUs connected at different points on this bus. Every bit transmitted to the bus is read back and checked for consistency. After the arbitration phase of the protocol, transmission errors are accumulated if the transmitted bits do not match the received ones. The protocol also checks for reception errors, which may be caused by, for example, lack of frame consistency, CRC mismatch, etc.

Automotive networks such as FlexRay, LIN, and CAN have a series of error detection, signaling, and fault-confinement mechanisms. Traditional error detection mechanisms include bit error, synchronization error, stuffing error. CRC error, frame error, acknowledgement error, etc. Internal counters keep track of these errors and, depending on the degradation model, the network node will be disconnected from the bus. The bus-off attack leverages this fault-containment feature to maliciously disconnect authentic nodes from the bus.

In CAN bus implementations, two counters are used to keep track of reception and transmission errors, namely Transmission Error Counter (TEC) and Receive Error Counter (REC). REC is incremented by 1 every time that a receiver detects an error. TEC is incremented by 8 if a transmission error is detected. Whenever a receiving node encounters an error while transmitting an error flag, its REC will also increase by 8—similar to transmission errors. The TEC and REC have specific error count bounds, such that the ECU will progress to a further error state based on the count stored in the TEC or REC.

In particular, to contain faults, after detecting a fault or transmission error, a CAN node may progressively change states to Error Active, Error Passive, and Bus-Off. Other protocols, such as FlexRay or LIN, also have degradation models. These networks are intrinsically unable to differentiate faults from attacks. As a consequence, they are equally susceptible to attacker's actions exploiting error management and fault containment mechanisms to disconnect authentic nodes from the bus. The attack mechanism for all networks is the interference with the authentic message transmission in such a way that the authentic node infers that a fault is happening. Depending on the network, this is initiated by causing conflicting message identifiers and payloads, as well as interfering with clock synchronization mechanisms.

Attacks against critical electronic control units (ECUs), such as the ones responsible for steering and breaking, may severely compromise passenger and road safety. There is currently no solution in the open literature for mitigating bus-off attacks.

Guaranteeing security and safety of autonomous vehicles is fundamental to implement any level of autonomous vehicle operation. The techniques described here protect our systems against malicious actions (e.g., the bus-off attack), by being able to reliably differentiate faults from attacks. The solution may be built in automotive products to make them more resilient against cyber-attacks.

Some conventional attempts to solve the bus-off attack include checking for two consecutive errors during transmissions or checking whether someone else on the bus transmitted the message that it owns. However, due to the novelty of the bus-off attack, there is no effective solution to detect, prevent, or mitigate it.

One strategy to address attacks caused by errors during transmission is to check for two consecutive transmission errors. This type of checking may mitigate against transient faults, but it is not resilient under a persistent adversary who is attempting a bus-off attack. Due to environmental conditions, several transient transmission faults may occur, as may be expected in a real-world deployment. In that case, a false detection of a bus-off attack would be triggered, while in reality they were authentic errors. Thus, checking for two consecutive errors would likely encounter too many false positives.

Another strategy is to have the victim ECU monitor the bus for messages with the same originator node identifier (e.g., another node is spoofing messages as if they were coming from the victim ECU). If an attacker is performing a bus-off attack, the authentic ECU will be stuck in a retransmission process, quickly accumulating transmission errors. In that period, due to the collision of the authentic and attacker's message on the bus, there will be no successful message transmissions. Therefore, even a naïve attacker would know that it has to wait for the target ECU to enter the bus-off state before engaging in the second part of the attack where it effectively masquerades as the authentic ECU. Thus, such an attack detection and mitigation technique is ineffective.

The present disclosure introduces a novel mechanism to detect and mitigate a bus-off attack, namely a Bus-Off Prevention (BOP) circuit. The underlying principle is based on the fact that it is possible to discern faults from attacks. The BOP circuit monitors the bus, and when it detects inconsistencies in information transmitted versus what is observed on the bus, it temporarily disconnects the victim node from the bus. Then, the BOP circuit analyzes how the bus settles. If the bus remains active after disconnection of the victim node, then an attacker is continuing to transmit on the bus and it is a bus-off attack; otherwise it is considered a fault. In addition, the BOP circuit is able to reverse the malicious actions against the attacker, which ultimately results in the bus-off of the malicious node rather than the authentic one.

Thus, this disclosure provides a new and improved mechanism for in-vehicle networks that utilizes specific circuitry to monitor for a bus-off attack. Aspects may be combined and modified to incorporate one aspect with one or more other aspects. Further, while this is generally discussed in view of a CAN bus, it may be extended to other types of automotive buses, such as FlexRay or LIN.

FIG. 1 is a diagram illustrating a CAN bus 100, according to an embodiment. Automotive CAN buses are implemented as a twisted pair of wires with ECUs (e.g., ECU 102A, 102B, . . . , 102N) connected at different points on this bus. The ends of the CAN bus 100 are terminated with 120Ω resistors.

ECUs 102 are able to send and receive messages to/from other ECUs 102 on the bus using a broadcast mechanism with nondestructive arbitration. Each message complies with a CAN bus protocol that includes a plurality of bits arranged in a plurality of fields. The fields include at least one bit, with each bit corresponding to a logic 0 ("zero bit") or a logic 1 ("one bit").

Physically, for a 2-wire bus, each bit may be represented by a differential voltage applied across the CAN bus 100. In the CAN bus protocol, for example, a first wire (e.g., conductor) is labeled CANH (high bus line) 106 and a second wire is labeled CANL (low bus line) 108. A transmitting ECU (e.g., ECU 102A) is configured to apply a first voltage, VCANH (i.e., high bus line voltage), to CANH and a second voltage, VCANL (i.e., low bus line voltage), to CANL in order to transmit a bit. In the CAN bus protocol, a 0 bit is considered "dominant" and a 1 bit is considered "recessive". In other words, a transmitting ECU is configured to actively drive the CANH and CANL lines to respective voltages to transmit a 0 bit and to passively pull (up and/or down) the CANH and CANL lines to respective voltages to transmit a 1 bit. Thus, if a first ECU is transmitting a 0 bit and a second ECU is transmitting a 1 bit, then the bus state will correspond to the 0 bit. This configuration allows nondestructive arbitration and collision avoidance. In other words, according to the CAN bus protocol, the second ECU will detect a bus state different from its transmitted bit and will halt transmission.

Figure 2:
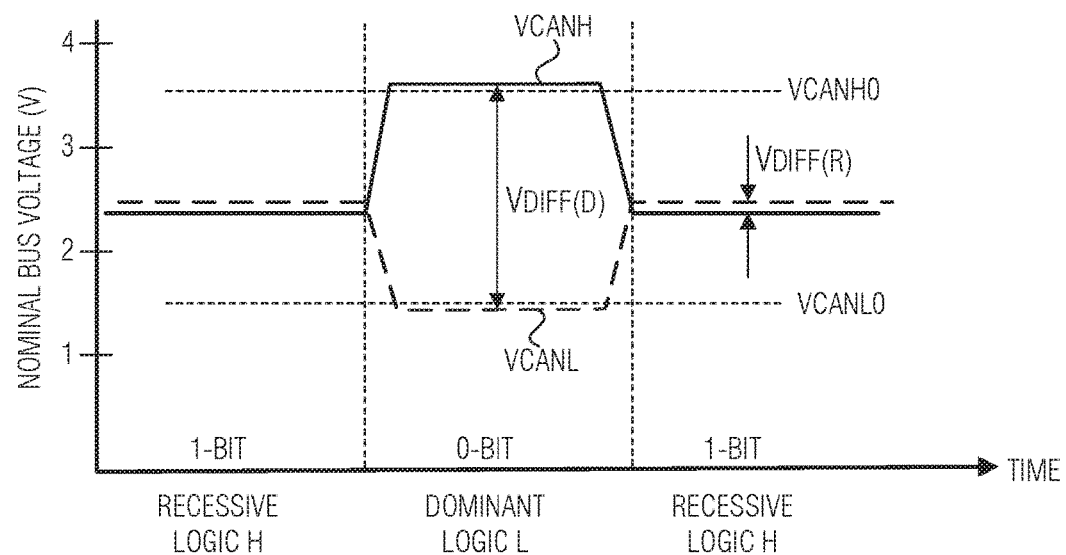
FIG. 2 is a diagram illustrating nominal recessive and dominant bus voltages for a CAN bus, according to an embodiment.

Signaling is further illustrated in FIG. 2, which is a diagram illustrating nominal recessive and dominant bus voltages for a CAN bus, according to an embodiment. When an ECU sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5V, while the VCANL0 may be about 1.5V. As used herein, "about" means plus or minus ten percent or other acceptable threshold.

In the recessive state, either the CAN bus 200 is idle or an ECU is transmitting a logic 1 (logical high). In the dominant state, at least one ECU is transmitting a logic 0 (logical low). Thus, a nominal differential voltage detected across the CANH and CANL lines during the dominant state corresponds to Vdiff(D)=VCANH0−VCANL0, and a differential voltage detected across the CANH and CANL lines during the recessive state corresponds to Vdiff(R)=Vcc/2, or approximately 2.5V, which may be subject to a tolerance specified in the protocol. For example, a 0 bit may correspond to VCANH nominally equal to 3.5V (VCANH0) and VCANL nominally equal to 1.5V (VCANL0), on CANH and CANL, respectively. However, due to process variations in the transistors and diodes within the ECUs' transceivers, when sending a 0 bit, each transmitter may output voltages that differ from the nominal values. For example, the actual output voltages for a number of ECUs may have a distribution, e.g., a Gaussian distribution, with a corresponding mean value and a corresponding standard deviation.

Figure 3A:
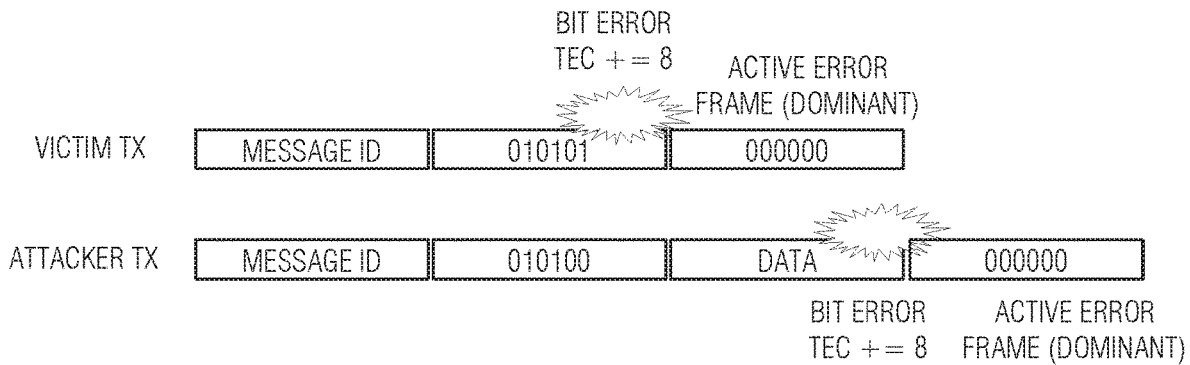
FIGS. 3A-3B illustrate an attack on a node in a bus, according to an embodiment.

In a bus-off attack, a malicious node constructs a frame that contains the same message identifier as the victim node, with a payload that differs from the victim node's message. The attacker node's payload includes dominant bits where the victim node expected to send recessive ones, as illustrated in FIG. 3A. The victim node will detect a bit-mismatch in the bus (bit error) and increment its TEC by 8. The victim node will then transmit an active error frame comprising six dominant bits (e.g., "000000"). As a consequence, the attacker node will detect a bit error and also increment its TEC by 8. Attacker and victim nodes will continue to accumulate errors until their respective TEC counts are greater than 127. When the TEC is greater than 127 they both enter the error passive state.

Figure 3B:
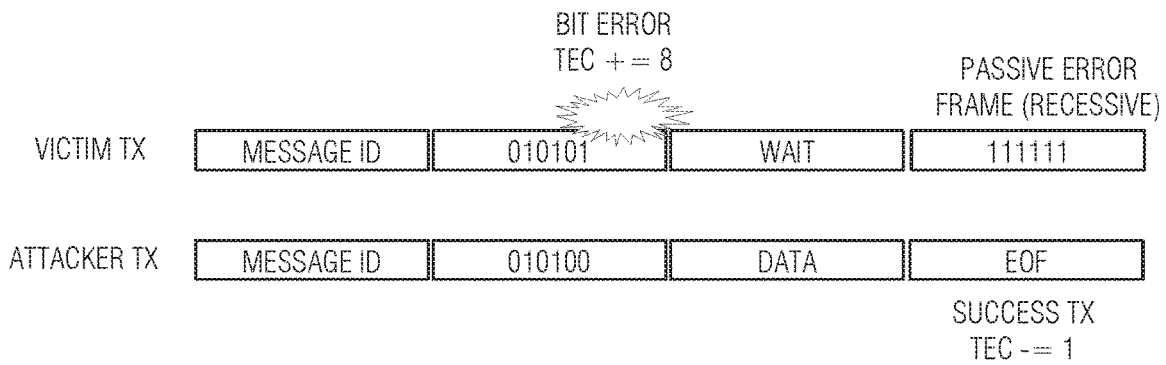

The attacker node continues with the attack (as shown in FIG. 3B), causing the victim node to accumulate additional bit errors. But, since the victim node is now in an error passive state, it will wait for the transmission of the attacker node to send an error passive frame. At this moment, the attacker node obtains a successful transmission, and decrements its TEC by 1, while the victim node increments its TEC by 8. By persisting in this methodology, the victim node's TEC will be continuously increased until it reaches 256. At that level, the victim node will switch to a bus-off state, disconnecting from the bus.

Specifically, FIG. 3A illustrates a messaging conflict between the victim's transmissions and the attacker's transmissions on the bus. Error accumulation during error-active phase as the attacker causes data errors and ignores the TEC count. In FIG. 3B, after the victim enters the error passive state, the attacker's transmission is transmitted successfully during victim's error passive state.

In order to mitigate bus-off attacks, additional circuitry referred as bus-off prevention (BOP) circuity is used to implement three main phases: i) Differentiate between faults and attacks, ii) Avoid accumulation of errors due to bus-off attempts, and iii) Revert malicious actions against the attacker.

Figure 4:
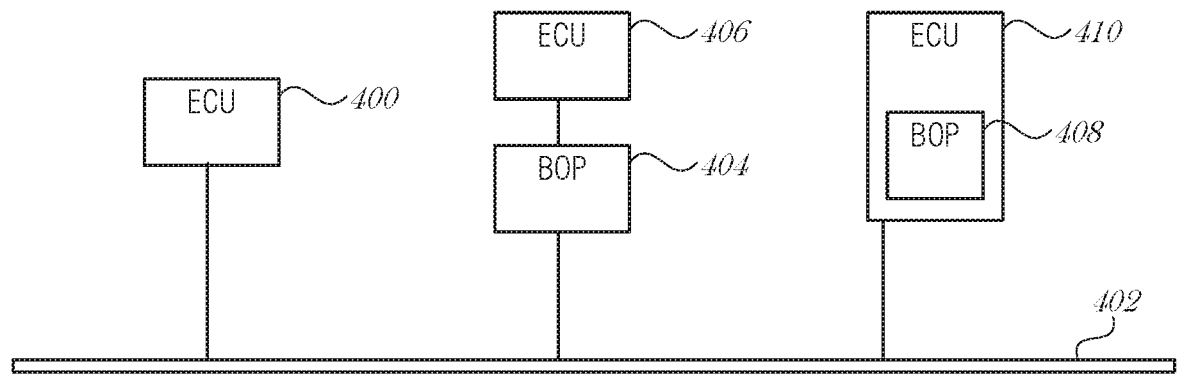
FIG. 4 illustrates ECU nodes on a bus, according to an embodiment.

FIG. 4 illustrates ECU nodes on a bus, according to an embodiment. A regular unprotected node 400 interfacing a bus 402 is shown, where the node 400 does not have BOP circuitry. In another instance, the BOP circuitry 404 may be placed between an ECU 406 and the bus 402. In yet another instance, the BOP circuitry 408 may be integrated with an ECU 410 (e.g., in the same packaging, on the same die, etc.). It is understood that in other implementations, several ECUs may be protected by the same BOP circuitry, such that one BOP circuit may manage messaging for several ECUs.

The bus-off attack only works because the victim node thinks that an error has happened in the bus, while in reality, there is an ongoing malicious bit-flip. Whenever the attacker node sends a message with the same message identifier (ID) as the victim node, the BOP circuitry (e.g., BOP circuitry 404 or BOP circuitry 408) will notice a mismatch between the bit transmitted by the victim node (protected by the BOP circuitry), and the one received from the bus. In other words, BOP circuitry 404, 408 is used to detect inconsistencies between information transmitted and observed on the bus. After detecting an inconsistency, observing ongoing bus behavior may be used to differentiate between a fault and an attack. The BOP circuitry 404, 408 may determine that, after temporarily disconnecting the victim node from the bus, if bus activity continues, then it is a bus-off attack, otherwise, it is considered a fault.

Figure 5:
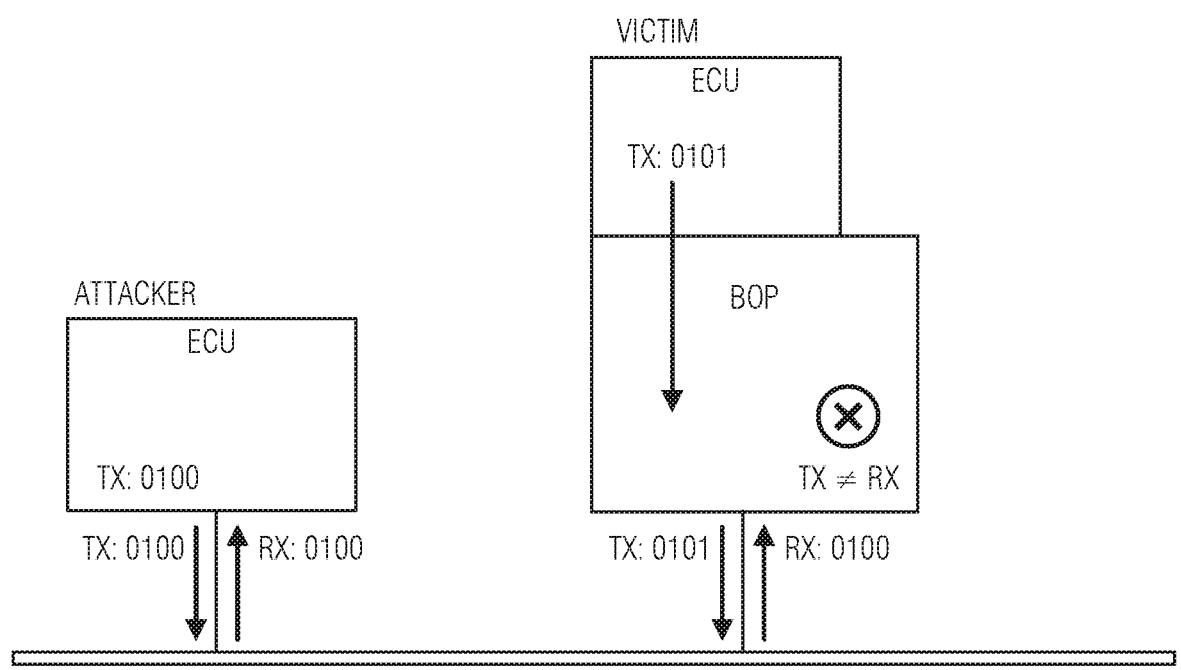
FIG. 5 illustrates a victim node's activity to determine what is happening in the bus, according to an embodiment.

Whenever BOP circuitry detects a bit-mismatch (as illustrated by TX≠RX in FIG. 5), it initiates a sequence to determine what is happening in the bus.

Figure 6:
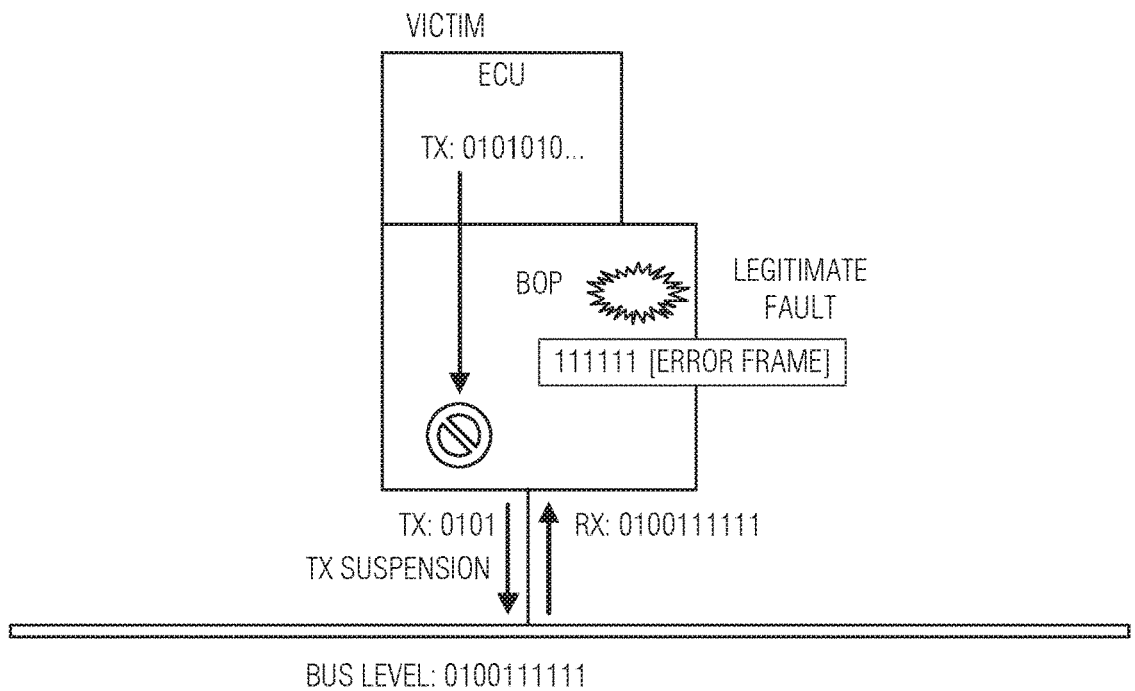
FIGS. 6-12 illustrate responsive actions of bus-off prevention circuity, according to various embodiments.

First, the BOP circuitry suspends transmission of subsequent bits to the bus. This has the goal of allowing the bus to settle in a recessive state. This is illustrated in FIG. 6, where the BOP circuitry suspends transmission of the ECU after observing the first bit-mismatch in the bus—the fourth bit transmitted by the ECU was 1, but the bus settled at 0.

Figure 7:
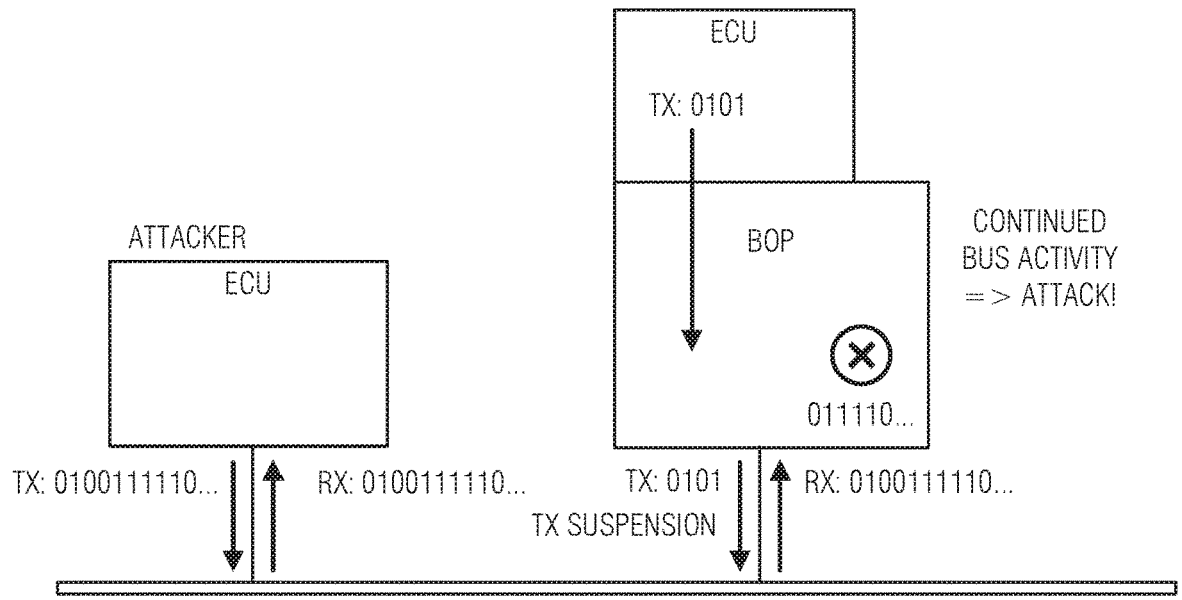

Second, the BOP circuitry analyzes the bus for attacker's activity. In the case of faults, the bus should settle in recessive state for six bits (e.g., "111111"). After that, other (receiving) ECUs in the network will report frame errors due to bit error. According to the CAN protocol, a dominant bit should have been received after the fifth recessive bit. This behavior, which is part of the CAN protocol indicates that the bit-mismatch was caused by fault. This context is illustrated in FIG. 6. In the case of an active attacker, the bus would not settle, and transmission would continue. The longest that the attacker can hide is for five identical bits. However, the attacker node must abide to the CAN protocol to avoid accumulating errors. Thus, the attacker must perform bit stuffing in the sixth consecutive bit of the attack stream. This indicates that the bus remains active and reveals the attacker's presence. This context is shown in FIG. 7.

Note that the worst case latency for differentiation is bounded by the CAN protocol. In other words, the CAN protocol specifies that a bit of opposite polarity must be placed after a sequence of five consecutive bits of the same polarity. Thus, the maximum latency to differentiate between a bit-mismatch caused by a fault and an attack is bounded by six bits. Since this happens within the frame, there is enough remaining bits to take actions towards the attacker.

In addition to differentiating faults from active bit-flipping attacks, the BOP circuitry may provide a mechanism to avoid the victim ECU from accumulating errors. The victim ECU is the one being attacked with dominant bits that are overlaying the authentic recessive bits being transmitted. The procedure is as follows.

Figure 8:
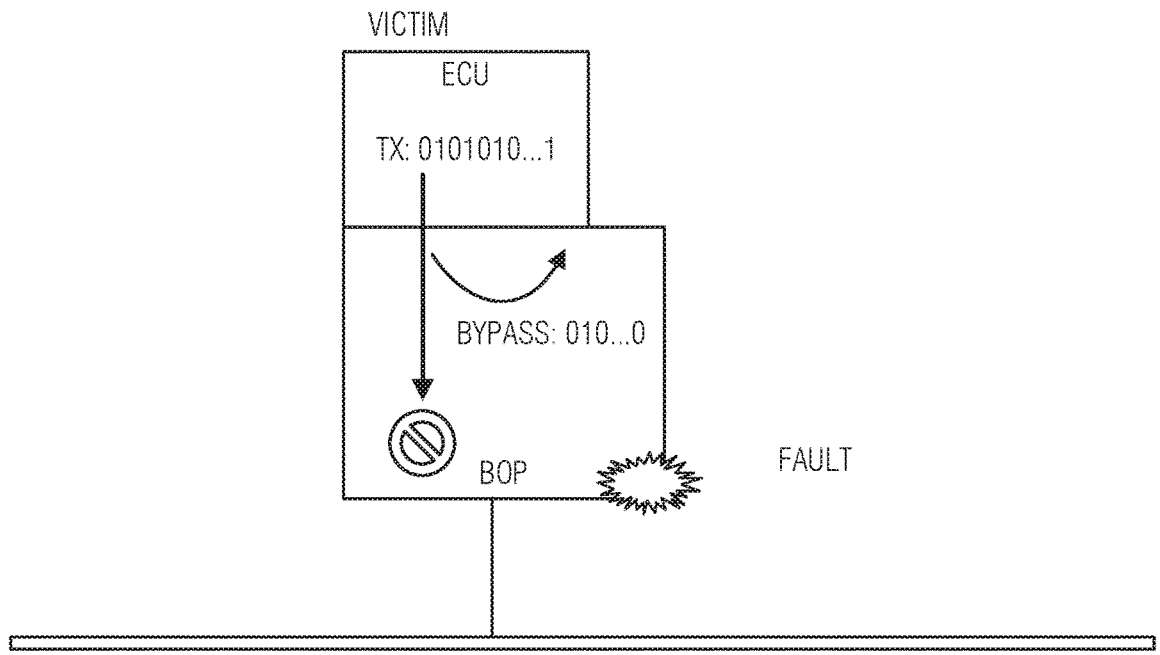

First, the BOP circuitry delays notification of bit mismatches to the victim ECU. This mechanism aims at delaying error accumulation until a decision is made on whether or not an attack is happening. More specifically, in this phase, the BOP circuitry feeds back to the victim ECU its own original transmission, depicted as the bypass arc in FIG. 8. In effect, this short circuit of the transmission and receive messages allows the victim ECU to continue operation without accumulating errors.

Second, the BOP circuitry informs the victim ECU of the reason for the error. This may be in the form of a portion of a status report provided to the victim ECU. The status report may also be used to provide additional information to the victim ECU.

The BOP circuitry determines the cause of the bit error in the message. In the case of a fault, the BOP circuitry injects an error into the stream being bypassed to the victim ECU. This mimics the fault (bit-mismatch) observed in the bus. The location of the bit error is irrelevant to the victim ECU and can be done anywhere in the frame after the message identifier field. The victim ECU accumulates an error, as it usually does in faulty conditions.

Figure 9:
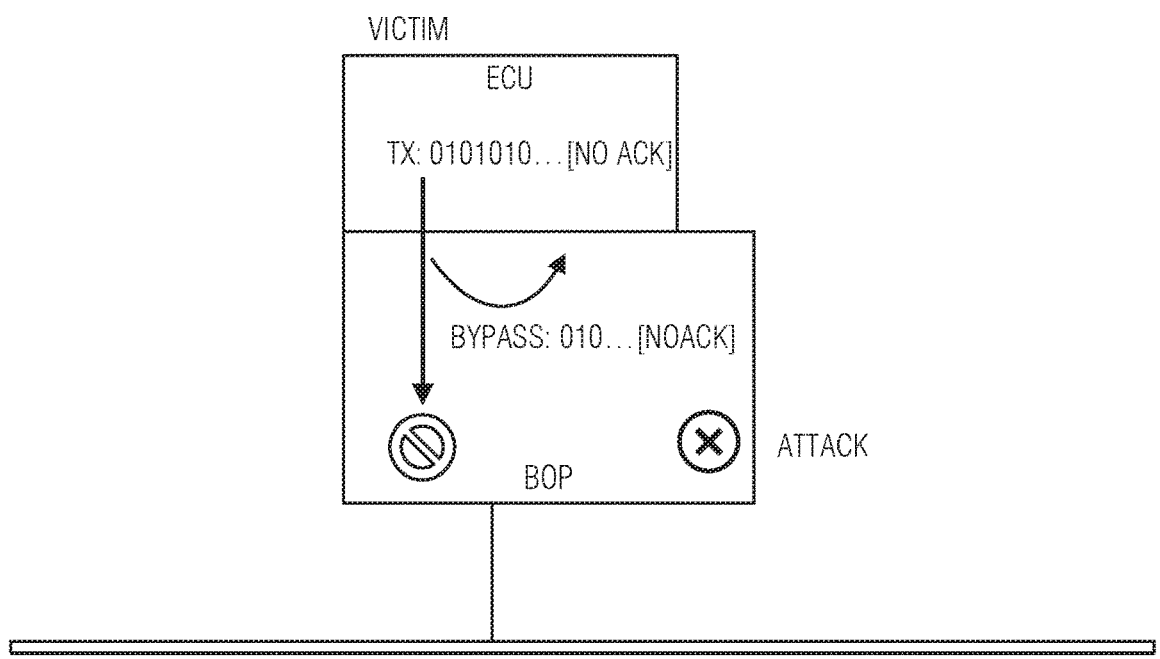
Figure 10:
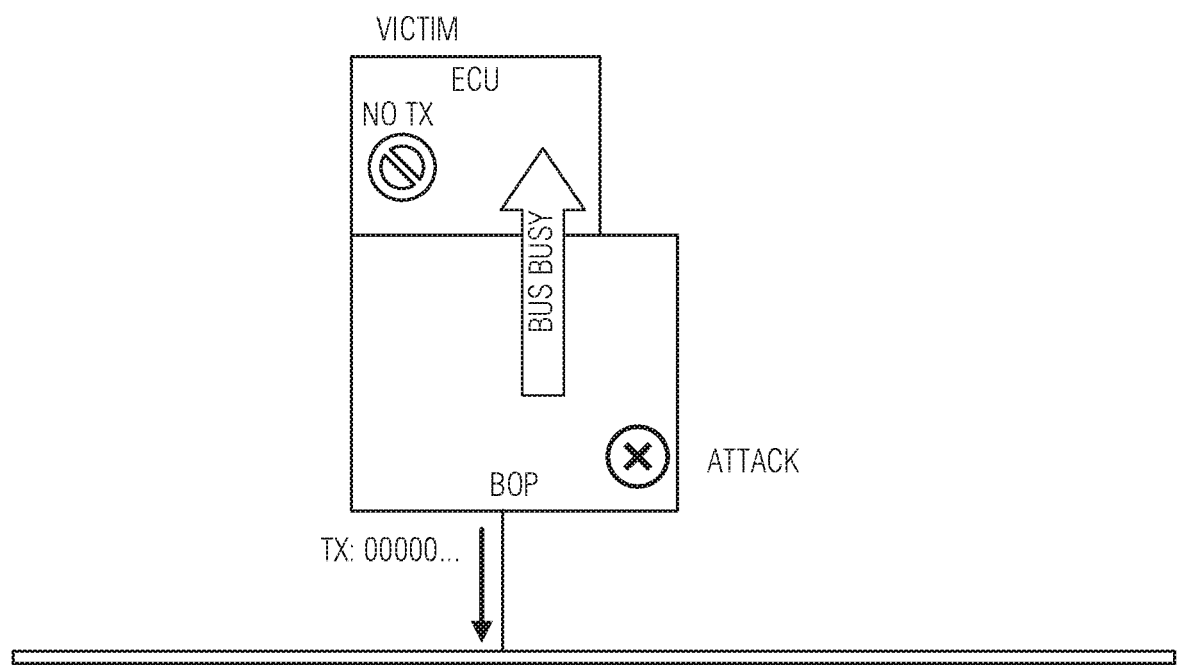

In the case of an active attacker, the BOP circuitry does not acknowledge the message to the victim ECU. Acknowledging the message is necessary to inform the victim ECU of a successful transmission. This is illustrated in FIG. 9. Instead, the BOP circuitry informs the victim ECU that the bus is busy to prevent further retransmissions, as shown in FIG. 10. This can be done, for instance, by raising the bus level to dominant, injecting high priority packages (message ID 0), etc. The bus is kept as busy during the duration of attacker isolation (described in the next section).

Once an active attacker situation has been detected, the BOP circuitry may take further action to revert the bus-off attempt against the attacker. This procedure may be performed in a variety of ways, for instance, by injecting dominant bits when the attacker is sending a recessive, by corrupting bit-stuffing rules, corrupting the frame format, etc. The interference with the attacker's transmission will cause it to accumulate errors aggregated in its TEC, first reaching an error passive state, and ultimately entering a bus-off state.

In an embodiment, the BOP circuitry leverages a feature of the CAN bus protocol to first isolate the attacker, and then release the victim ECU to reinitiate bus transmissions. More specifically, once the BOP circuitry corrupts one of the attacker's message, the attacker's CAN protocol chip will immediately try a retransmit at the next opportunity. Once it does, the BOP circuitry corrupts it again. The attacker's CAN protocol chip becomes stuck in this cycle, hoping that in normal conditions a transmission would occur. However, since the BOP circuitry corrupts every single frame that the attacker sends, it will cause the attacker to quickly accumulate enough errors to enter a bus-off state. The maximum latency to isolate the attacker is bounded by the CAN protocol. More specifically, at each transmission error, the attacker's TEC is increased by 8. Hence, to reach a bus-off state (TEC=256), all it takes is 32 messages. After that period of time, the BOP circuitry releases the victim ECU to resume transmissions to the bus.

One may consider a less naïve attacker, who may try to escape from isolation. In this case, the attacker may try to time the malicious messages so that valid frames are still transmitted. If the attacker could succeed in sending messages, it could decrease its own TEC and therefore avoid entering bus-off. Nevertheless, once the attacker is detected, the BOP circuitry will intercept any subsequent malicious transmission of the attacker. Hence, an attacker node would never succeed, and will ultimately enter bus-off state.

In an embodiment, the attacker ECU is not isolated. Instead, when an attacker is detected, logs or other information about the attack are recorded. This may be useful to track the activities of an attacker node and observe the extent or type of attacks being initiated. A non-isolation technique may be used when the victim ECU is able to transmit valid messages.

In another embodiment, a victim ECU is protected by BOP circuitry in a way that provides protection for the victim ECU from bus-off attacks without incurring any errors at the victim ECU.

In such an embodiment, the BOP circuitry includes memory (e.g., a register) and other circuitry to store messages transmitted by the victim ECU. The memory acts as a temporary storage and may be used during an attack/fault differentiation. When a bit mismatch is detected on the bus, the BOP circuitry determines the cause of the mismatch. This may be performed using methods described above, such as by analyzing bus activity after message transmission for continued activity.

Figure 11:
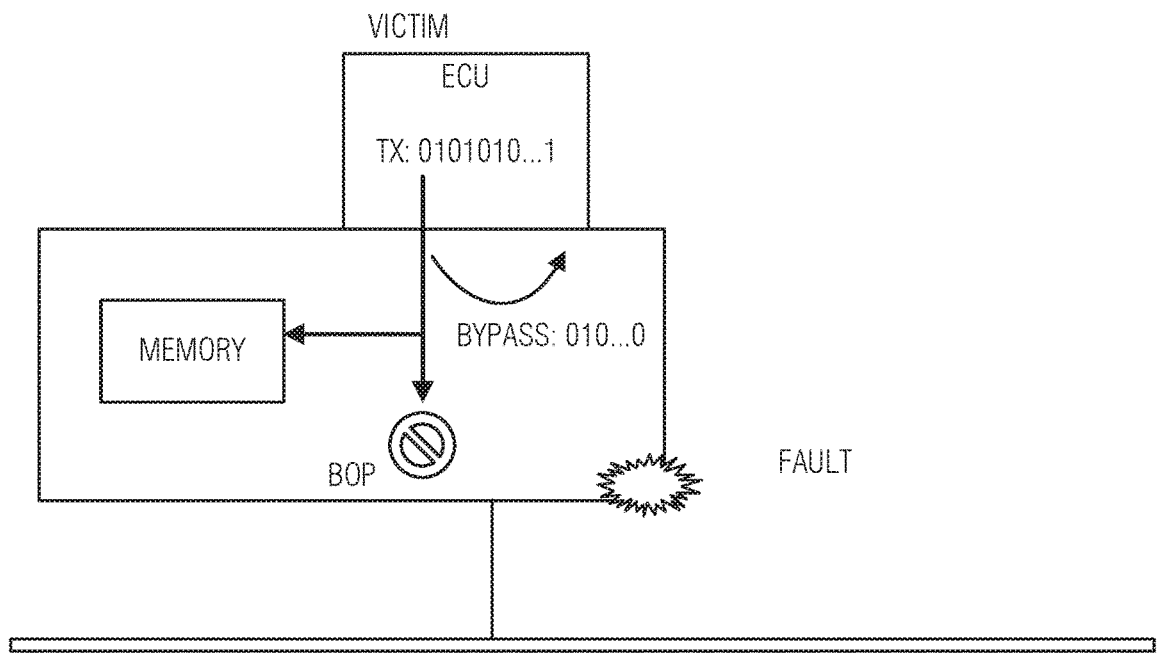

As illustrated in FIG. 11, in case of a fault, information stored in the memory is discarded. The BOP circuitry may emulate a bit error in the feedback stream using a bypass channel. The bit error replicates the bit error detected in the bus that was caused by the authentic fault. In this fault condition, the transmitting victim ECU increments its TEC as it normally would without the BOP circuitry.

Figure 12:
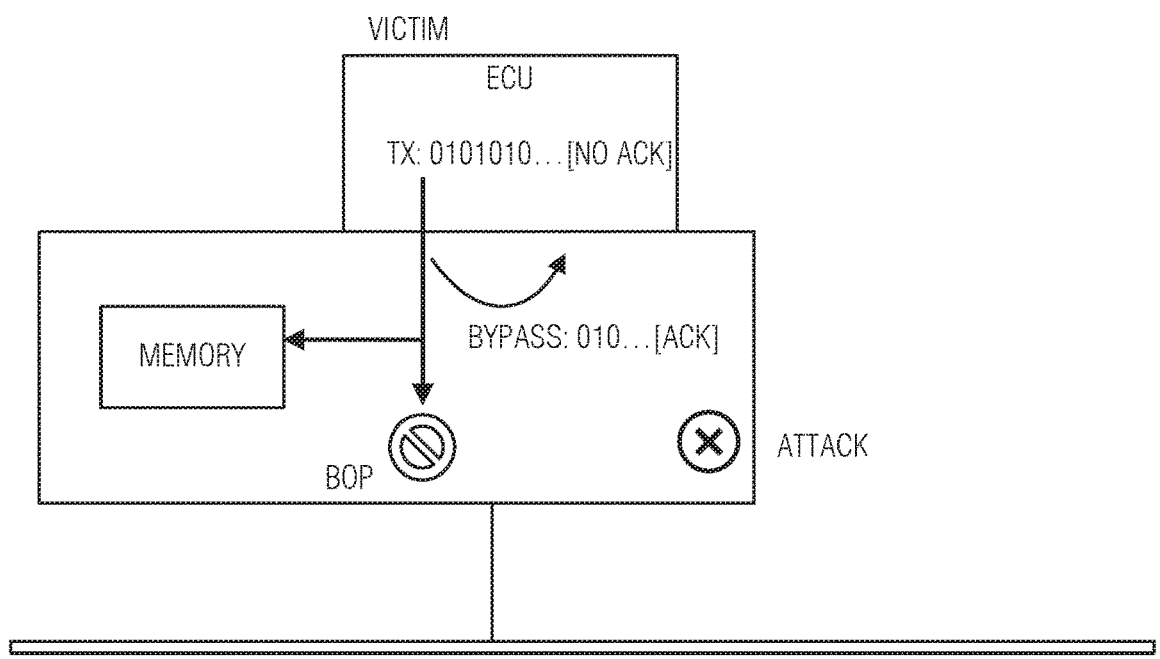

As illustrated in FIG. 12, in case of an attack, the BOP circuitry may first acknowledge the message that was transmitted by the victim ECU so that the victim ECU does not incur any errors. The acknowledge message may be transmitted using the bypass channel. That indicates to the victim ECU that the message has been successfully transmitted. At that point the BOP circuitry may take custody of the transmitted message by storing it in the memory. After attack isolation, the BOP circuitry finds the next opportunity in the bus to transmit the stored message. Once transmission is done, the BOP circuitry removes that message from its internal register. The delay incurred in case of attacks is bounded by 32 messages. Delays of this magnitude are expected in normal operational conditions due to bus arbitration. Therefore, retransmitting the stored information may be beneficial in a number of cases. The exception would represent the minority of cases, where time-critical ECUs would demand more stringent reception deadlines than the remainder of the system.

While the stored message is waiting for bus transmission, the victim ECU may want to transmit new messages. Depending on the type of ECU and its context of use, the BOP circuitry may perform one of two methods. In the first method, the BOP circuitry blocks new transmissions by indicating to the victim ECU that the bus is busy. Thus, the BOP circuitry will accept a new message from the victim ECU only after transmitting the previous one to the bus. In the second method, the BOP uses first-in-first-out (FIFO) queue structure to maintain messages transmitted by the victim ECU in their transmission order. After the attacker node is isolated, the BOP circuitry is able to transmit stored messages to the bus. Any acknowledgement messages received from other nodes on the bus that are sent in response to these stored messages are discarded by the BOP circuity because the victim ECU has already received acknowledgements from the BOP circuitry via the bypass channel. The BOP circuitry is also responsible to check for future faults and attacks during the transmission of the stored messages.

Embodiments described herein are used to differentiate bit-mismatches from attacks. Single bit-mismatches may be classified as short transient faults, in which a single bit is corrupted. Long transient faults are also captured, in which multiple bits are corrupted and may span into more than one frame.

The differentiation of attack versus faults in a long transient fault scenario may be performed by inspecting the entire consistency of the frame, rather than 6 bits. Upon the first bit-mismatch, as before, the BOP circuitry triggers the disconnect of the victim ECU as well as the differentiation operation. Next, the entire consistency of the frame in the bus is inspected. If the consistency is not maintained, that is an indication of a multi-bit mismatch. An attacker would not create such a faulty frame, otherwise it would induce an error. If consistency is maintained, then it is an indication of an attack. In both cases, the latency to perform the differentiation may be as long as the entire duration of the frame.

Thus, in an embodiment, the BOP circuitry can transmit an erroneous frame to the protected ECU, allowing the ECU to accumulate a single error. The BOP circuitry keeps the protected ECU disconnected from the bus (e.g., by signaling bus busy, etc., as previously described) for as long as the attacker is active. Since the protected ECU is now disconnected, its messages should no longer be present in the bus. Hence, any further message that the attacker may send that is tagged as being owned by the protected ECU are easily identified and caught, as that is a case of impersonation. The BOP circuitry may choose to engage in attacker isolation. The BOP circuitry may perform this by corrupting bits of the malicious message, which will invalidate it and prevent other ECUs from consuming it. The BOP circuitry may choose to persistently corrupt the attacker's messages, consequently forcing the attacker to follow a fault containment procedure and ultimately disconnecting from the bus. Once such an isolation procedure is complete, the BOP circuitry is able to release the protected ECU to transmit again.

In another embodiment, the BOP circuit may temporarily store the messages from the protected ECU to inspect the bus and isolate the protected ECU. The BOP circuitry may store the transmitted frame as it is put on the bus by the victim ECU. In this case, the BOP circuitry relays the transmitted frame to the protected ECU, therefore avoiding the error accumulation at the ECU, while monitoring the bus to determine whether the transmitted frame is corrupted in some way, which may indicate an active attack or a transient fault. In response to determining that the frame corruption is due to an active attack, the BOP circuitry may choose to follow the same attacker isolation procedure, as previously described. During this time, the BOP circuitry does not allow any response messages to reach the protected ECU. Also, during this time, any additional messages that are transmitted by the protected ECU are trapped and stored by the BOP circuitry. Once the attacker is isolated, the BOP circuitry may release the stored message to the bus and allow the bus signals to be relayed to the protected ECU, as in normal operation. As the message or messages are released from the temporary storage, the BOP circuitry may continue to monitor transmissions for single or multi-bit faults and attacks.

In the case of a multi-bit mismatch due to a legitimate long transient fault, the BOP circuitry may provide the victim ECU with the received frame. The victim ECU would then perform conventional error handling techniques when sensing such data errors.

Message passing between the BOP circuitry and the protected ECU may be supported by special circuitry in the protected ECU. The channel between the BOP circuitry and the protected ECU may be a regular bus (e.g., CAN bus, Ethernet, serial peripheral interface (SPI), etc.) or require other circuitry. Messages may be used to inform the protected ECU of bus state, attacker identification, BOP circuitry state, or other information. Additionally, messages may be provided to other ECUs on the bus, for example, to warn those ECUs of a possible attacker on the bus.

It is understood that these types of mechanisms may be used with other bus technologies and protocols. In the case of FlexRay, the error handling mechanism constantly checks for the time synchronization of the node. Similar to CAN, a FlexRay node can be in three states, namely Normal Active, Normal Passive, and Halt. In case of synchronization degradation, the node will move from normal active to normal passive. If synchronization problem persists, the node will enter a halt state. FlexRay provides more flexibility on the conditions to transition states and have provisions for the host to be informed of such extreme conditions. Regardless, an active attacker will persist in the interference with the system therefore causing it to enter the Halt state.

LIN has a status management mechanism detects errors during operation. The goal is to detect faulty nodes as well as provide means for them to enter limp mode. LIN spec does not provide specific conditions for the nodes to enter limp mode and leave such management for the application. As any other high reliability system, error conditions and limp mode must be addressed, which ends up opening up an opportunity to be exploited similarly to CAN and FlexRay.

Figure 13:
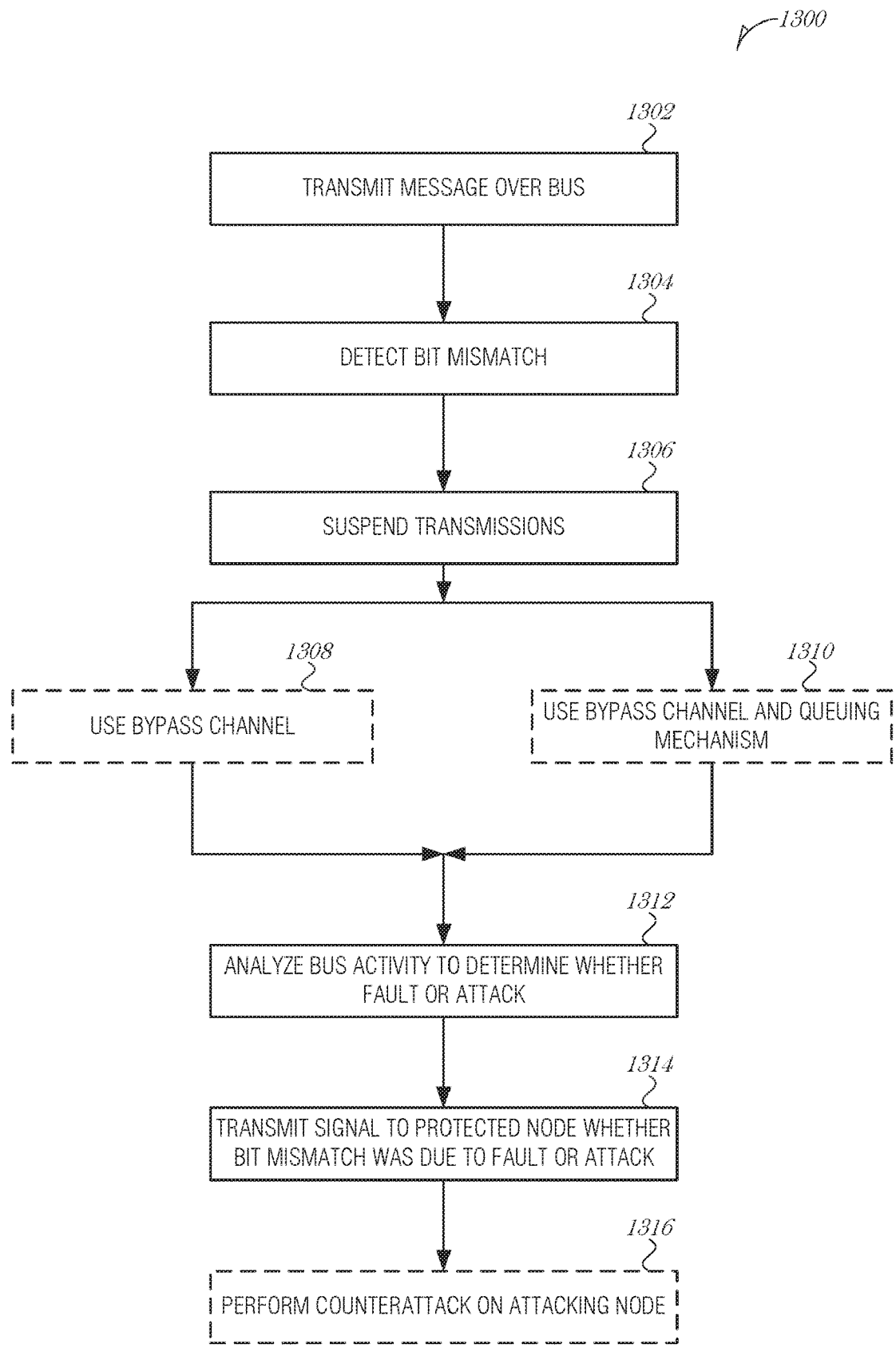
FIG. 13 is a flowchart illustrating a bus-off prevention method, according to an embodiment.

FIG. 13 is a flowchart illustrating a bus-off prevention method 1300, according to an embodiment. At 1302, a protected node attempts to transmit a message over a bus. The bus may be a CAN bus. In other embodiments, the bus may be implemented according to FlexRay or LIN specifications.

After the transmission, a bit mismatch is detected by bus-off protection (BOP) circuitry (operation 1304). The bit mismatch is determined by comparing the transmitted bits with received or sensed bits observed on the bus.

At 1306, the protected node's transmissions are suspended by the BOP circuitry. The BOP circuitry may suspend the protected node's transmissions by delaying notifications of bit mismatches to the protected node by feeding back to the protected node its own original transmission. This short circuit mechanism allows the protected node to continue operation without accumulating errors.

At 1308, an optional operation may be implemented where the BOP circuitry uses a bypass channel to provide the protected node signaling and control its operations while diagnosing the cause of the bit mismatch. This bypass channel is used to short circuit the signaling and feed back the original transmission to the protected node. This is illustrated and discussed above with respect to FIGS. 8-10.

At 1310, another alternative optional operation may be implemented where the BOP circuitry uses a queuing mechanism to temporarily store the protected node's outgoing messages while the BOP circuitry diagnoses and addresses the bit mismatch. This is illustrated and discussed above with respect to FIGS. 11-12.

At 1312, the BOP circuitry analyzes the bus activity to determine whether the cause of the bit mismatch was a transient fault or a purposeful attack by an attacker node. By temporarily suspending the protected node's transmissions, the BOP circuitry is able to watch the bus traffic and determine whether the bit error was an anomaly (e.g., a transient fault) or a persistent event (e.g., a potential attack). In the case of faults, the bus should settle in recessive state for six bits (e.g., "111111"). After that, other (receiving) ECUs in the network will report frame errors due to bit error. According to the CAN protocol, a dominant bit should have been received after the fifth recessive bit. This behavior, which is part of the CAN protocol, indicates that the bit-mismatch was caused by fault. In the case of an active attacker, the bus would not settle, and transmission would continue. When the bus remains active, it reveals the attacker's presence.

At 1314, the BOP circuitry transmits a signal to the protected node indicating whether the bit mismatch was due to a transient fault or an attack. The signal may be a dedicated signal or message and formatted to specifically inform the protected node of the bus context. The protected node may take actions, such as logging the fault or attack, suspending transmissions, notifying another device, or the like.

At 1316, the BOP circuitry may optionally perform a counterattack on the attacking node to disable the attacking node. As discussed above, the BOP circuitry may take further action to revert the bus-off attempt against the attacker. This procedure may be performed in a variety of ways, for instance, by injecting dominant bits when the attacker is sending a recessive, by corrupting bit-stuffing rules, corrupting the frame format, etc. The interference with the attacker's transmission will cause it to accumulate errors aggregated in its TEC, first reaching an error passive state, and ultimately entering a bus-off state.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry 402 may be embodied as a stand-alone integrated circuit or may be incorporated as one of several components on an integrated circuit. In some embodiments, the various components and circuitry of a node or other systems may be combined in a system-on-a-chip (SoC) architecture.

Figure 14:
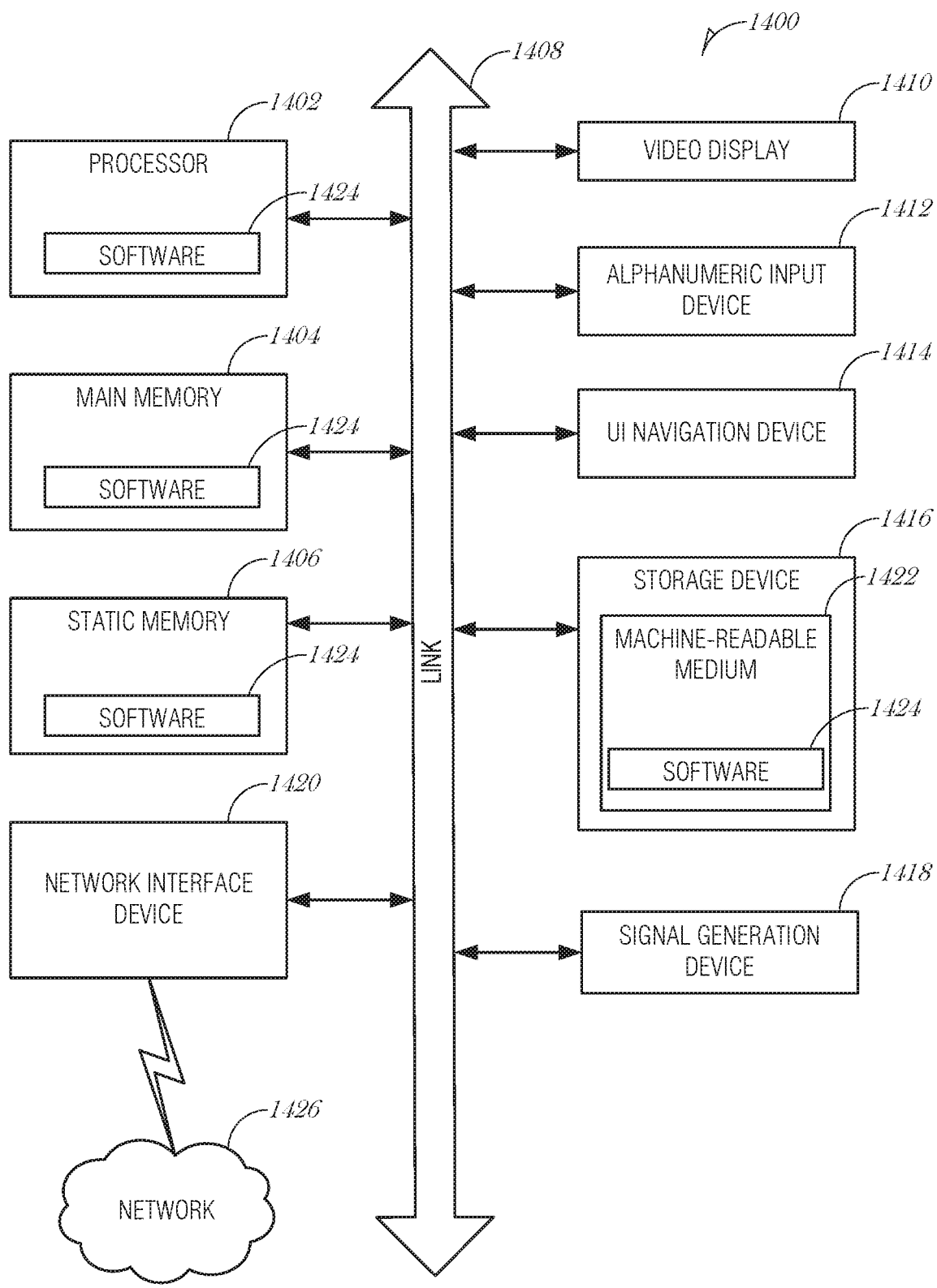
FIG. 14 is a block diagram illustrating an example machine upon which any one or more of the techniques (e.g., methodologies) discussed herein may perform, according to an embodiment.

FIG. 14 is a block diagram illustrating a machine in the example form of a computer system 1400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1400 includes at least one processor 1402 (e.g., a central processing unit (CPU), a graphics processing unit (GPU) or both, processor cores, compute nodes, etc.), a main memory 1404 and a static memory 1406, which communicate with each other via a link 1408 (e.g., bus). The computer system 1400 may further include a video display unit 1410, an alphanumeric input device 1412 (e.g., a keyboard), and a user interface (UI) navigation device 1414 (e.g., a mouse). In one embodiment, the video display unit 1410, input device 1412 and UI navigation device 1414 are incorporated into a touch screen display. The computer system 1400 may additionally include a storage device 1416 (e.g., a drive unit), a signal generation device 1418 (e.g., a speaker), a network interface device 1420, and one or more sensors (not shown), such as a global positioning system (GPS) sensor, compass, accelerometer, gyrometer, magnetometer, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404, static memory 1406, and/or within the processor 1402 during execution thereof by the computer system 1400, with the main memory 1404, static memory 1406, and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks: magneto-optical disks; and CD-ROM and DVD-ROM disks.

The instructions 1424 may further be transmitted or received over a communications network 1426 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth. Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is an electronic device for bus-off attack detection and prevention, the device comprising: bus-off prevention circuitry coupled to a protected node on a bus, the bus-off prevention circuitry to: detect a transmitted message from the protected node to the bus; detect a bit mismatch of the transmitted message on the bus; suspend further transmissions from the protected node while the bus is analyzed; determine whether the bit mismatch represents a bus fault or an active attack against the protected node; and signal the protected node indicating whether a fault has occurred.

In Example 2, the subject matter of Example 1 includes, wherein the bus-off prevention circuitry is incorporated into the protected node.

In Example 3, the subject matter of Examples 1-2 includes, wherein the bus-off prevention circuitry is separately packaged from the protected node.

In Example 4, the subject matter of Examples 1-3 includes, wherein to suspend further transmission from the protected node, the bus-off prevention circuitry is to: use a bypass channel to transmit the transmitted message back to the protected node.

In Example 5, the subject matter of Examples 1-4 includes, wherein to suspend further transmission from the protected node, the bus-off prevention circuitry is to: use a bypass channel to transmit an altered message back to the protected node, the altered message including a bit flipped from the transmitted message.

In Example 6, the subject matter of Examples 1-5 includes, wherein to suspend further transmission from the protected node, the bus-off prevention circuitry is to: use a bypass channel to transmit a high-priority message back to the protected node, the high-priority message indicating that the bus is busy.

In Example 7, the subject matter of Examples 1-6 includes, wherein to determine whether the bit mismatch represents the bus fault or the active attack against the protected node, the bus-off prevention circuitry is to: store the transmitted message in a memory device: receive a sensed message from the bus; compare the transmitted message to the sensed message to identify a multi-bit mismatch between the transmitted message and the sensed message; and identify the multi-bit mismatch as the bus fault or active attack.

In Example 8, the subject matter of Examples 1-7 includes, a memory device, wherein the bus-off prevention circuitry is to: store the transmitted message in the memory device; delete the transmitted message from the memory device when the bit mismatch represents the bus fault; and transmit the transmitted message form the memory device to the bus at a later time when the bit mismatch represents the active attack.

In Example 9, the subject matter of Example 8 includes, wherein the memory device is configured as a first-in first-out queue and wherein the bus-off prevention circuitry is to: store multiple transmitted messages in the memory device; and delete or transmit the stored multiple transmitted messages depending on whether the bit mismatch represents the bus fault or active attack, respectively.

In Example 10, the subject matter of Examples 1-9 includes, wherein to determine whether the bit mismatch represents the bus fault or the active attack against the protected node, the bus-off prevention circuitry is to: monitor bus activity on the bus for signaling that represents six bits; identify the bit mismatch as the bus fault when the six bits all represent a recessive state; and identify the bit mismatch as the active attack when the six bits are not all in the recessive state.

In Example 11, the subject matter of Examples 1-10 includes, wherein the bus-off prevention circuitry is to: identify a message from an attacker node participating in the active attack; corrupt the message from the attacker node to produce a corrupted message; and broadcast the corrupted message on the bus.

Example 12 is a method for bus-off attack detection and prevention, the method performed by bus-off prevention circuitry coupled to a protected node on a bus, the method comprising: detecting a transmitted message from the protected node to the bus: detecting a bit mismatch of the transmitted message on the bus; suspending further transmissions from the protected node while the bus is analyzed; determining whether the bit mismatch represents a bus fault or an active attack against the protected node; and signaling the protected node indicating whether a fault has occurred.

In Example 13, the subject matter of Example 12 includes, wherein the bus-off prevention circuitry is incorporated into the protected node.

In Example 14, the subject matter of Examples 12-13 includes, wherein the bus-off prevention circuitry is separately packaged from the protected node.

In Example 15, the subject matter of Examples 12-14 includes, wherein suspending further transmission from the protected node comprises using a bypass channel to transmit the transmitted message back to the protected node.

In Example 16, the subject matter of Examples 12-15 includes, wherein suspending further transmission from the protected node comprises using a bypass channel to transmit an altered message back to the protected node, the altered message including a bit flipped from the transmitted message.

In Example 17, the subject matter of Examples 12-16 includes, wherein suspending further transmission from the protected node comprises using a bypass channel to transmit a high-priority message back to the protected node, the high-priority message indicating that the bus is busy.

In Example 18, the subject matter of Examples 12-17 includes, wherein determining whether the bit mismatch represents the bus fault or the active attack against the protected node comprises: storing the transmitted message in a memory device; receiving a sensed message from the bus; comparing the transmitted message to the sensed message to identify a multi-bit mismatch between the transmitted message and the sensed message: and identifying the multi-bit mismatch as the bus fault or active attack.

In Example 19, the subject matter of Examples 12-18 includes, storing the transmitted message in a memory device; deleting the transmitted message from the memory device when the bit mismatch represents the bus fault; and transmitting the transmitted message form the memory device to the bus at a later time when the bit mismatch represents the active attack.

In Example 20, the subject matter of Example 19 includes, wherein the memory device is configured as a first-in first-out queue and wherein the method comprises: storing multiple transmitted messages in the memory device; and deleting or transmit the stored multiple transmitted messages depending on whether the bit mismatch represents the bus fault or active attack, respectively.

In Example 21, the subject matter of Examples 12-20 includes, wherein determining whether the bit mismatch represents the bus fault or the active attack against the protected node comprises: monitoring bus activity on the bus for signaling that represents six bits; identifying the bit mismatch as the bus fault when the six bits all represent a recessive state; and identifying the bit mismatch as the active attack when the six bits are not all in the recessive state.

In Example 22, the subject matter of Examples 12-21 includes, identifying a message from an attacker node participating in the active attack; corrupting the message from the attacker node to produce a corrupted message; and broadcasting the corrupted message on the bus.

Example 23 is at least one machine-readable medium including instructions, which when executed by a machine, cause the machine to perform operations of any of the methods of Examples 12-22.

Example 24 is an apparatus comprising means for performing any of the methods of Examples 12-22.

Example 25 is an apparatus for bus-off attack detection and prevention using bus-off prevention circuitry coupled to a protected node on a bus, the apparatus comprising: means for detecting a transmitted message from the protected node to the bus; means for detecting a bit mismatch of the transmitted message on the bus; means for suspending further transmissions from the protected node while the bus is analyzed; means for determining whether the bit mismatch represents a bus fault or an active attack against the protected node; and means for signaling the protected node indicating whether a fault has occurred.

In Example 26, the subject matter of Example 25 includes, wherein the bus-off prevention circuitry is incorporated into the protected node.

In Example 27, the subject matter of Examples 25-26 includes, wherein the bus-off prevention circuitry is separately packaged from the protected node.

In Example 28, the subject matter of Examples 25-27 includes, wherein the means for suspending further transmission from the protected node comprise means for using a bypass channel to transmit the transmitted message back to the protected node.

In Example 29, the subject matter of Examples 25-28 includes, wherein the means for suspending further transmission from the protected node comprise means for using a bypass channel to transmit an altered message back to the protected node, the altered message including a bit flipped from the transmitted message.

In Example 30, the subject matter of Examples 25-29 includes, wherein the means for suspending further transmission from the protected node comprise means for using a bypass channel to transmit a high-priority message back to the protected node, the high-priority message indicating that the bus is busy.

In Example 31, the subject matter of Examples 25-30 includes, wherein the means for determining whether the bit mismatch represents the bus fault or the active attack against the protected node comprise: means for storing the transmitted message in a memory device; means for receiving a sensed message from the bus; means for comparing the transmitted message to the sensed message to identify a multi-bit mismatch between the transmitted message and the sensed message; and means for identifying the multi-bit mismatch as the bus fault or active attack.

In Example 32, the subject matter of Examples 25-31 includes, means for storing the transmitted message in a memory device; means for deleting the transmitted message from the memory device when the bit mismatch represents the bus fault; and means for transmitting the transmitted message form the memory device to the bus at a later time when the bit mismatch represents the active attack.

In Example 33, the subject matter of Example 32 includes, wherein the memory device is configured as a first-in first-out queue and wherein the apparatus comprises: means for storing multiple transmitted messages in the memory device; and means for deleting or transmit the stored multiple transmitted messages depending on whether the bit mismatch represents the bus fault or active attack, respectively.

In Example 34, the subject matter of Examples 25-33 includes, wherein the means for determining whether the bit mismatch represents the bus fault or the active attack against the protected node comprise: means for monitoring bus activity on the bus for signaling that represents six bits; means for identifying the bit mismatch as the bus fault when the six bits all represent a recessive state; and means for identifying the bit mismatch as the active attack when the six bits are not all in the recessive state.

In Example 35, the subject matter of Examples 25-34 includes, means for identifying a message from an attacker node participating in the active attack; means for corrupting the message from the attacker node to produce a corrupted message; and means for broadcasting the corrupted message on the bus.

Example 36 is at least one machine-readable medium including instructions for bus-off attack detection and prevention, the instructions when executed by bus-off prevention circuitry coupled to a protected node on a bus, cause the bus-off prevention circuitry to perform the operations comprising: detecting a transmitted message from the protected node to the bus; detecting a bit mismatch of the transmitted message on the bus; suspending further transmissions from the protected node while the bus is analyzed; determining whether the bit mismatch represents a bus fault or an active attack against the protected node; and signaling the protected node indicating whether a fault has occurred.

In Example 37, the subject matter of Example 36 includes, wherein the bus-off prevention circuitry is incorporated into the protected node.

In Example 38, the subject matter of Examples 36-37 includes, wherein the bus-off prevention circuitry is separately packaged from the protected node.

In Example 39, the subject matter of Examples 36-38 includes, wherein suspending further transmission from the protected node comprises using a bypass channel to transmit the transmitted message back to the protected node.

In Example 40, the subject matter of Examples 36-39 includes, wherein suspending further transmission from the protected node comprises using a bypass channel to transmit an altered message back to the protected node, the altered message including a bit flipped from the transmitted message.

In Example 41, the subject matter of Examples 36-40 includes, wherein suspending further transmission from the protected node comprises using a bypass channel to transmit a high-priority message back to the protected node, the high-priority message indicating that the bus is busy.

In Example 42, the subject matter of Examples 36-41 includes, wherein determining whether the bit mismatch represents the bus fault or the active attack against the protected node comprises: storing the transmitted message in a memory device; receiving a sensed message from the bus; comparing the transmitted message to the sensed message to identify a multi-bit mismatch between the transmitted message and the sensed message; and identifying the multi-bit mismatch as the bus fault or active attack.

In Example 43, the subject matter of Examples 36-42 includes, storing the transmitted message in a memory device: deleting the transmitted message from the memory device when the bit mismatch represents the bus fault; and transmitting the transmitted message form the memory device to the bus at a later time when the bit mismatch represents the active attack.

In Example 44, the subject matter of Example 43 includes, wherein the memory device is configured as a first-in first-out queue and wherein the operations comprise: storing multiple transmitted messages in the memory device: and deleting or transmit the stored multiple transmitted messages depending on whether the bit mismatch represents the bus fault or active attack, respectively.

In Example 45, the subject matter of Examples 36-44 includes, wherein determining whether the bit mismatch represents the bus fault or the active attack against the protected node comprises: monitoring bus activity on the bus for signaling that represents six bits; identifying the bit mismatch as the bus fault when the six bits all represent a recessive state; and identifying the bit mismatch as the active attack when the six bits are not all in the recessive state.

In Example 46, the subject matter of Examples 36-45 includes, identifying a message from an attacker node participating in the active attack; corrupting the message from the attacker node to produce a corrupted message; and broadcasting the corrupted message on the bus.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An electronic device for bus-off attack detection and prevention, the electronic device comprising:
   a memory device; and
   bus-off prevention circuitry coupled to a protected node on a bus, the bus-off prevention circuitry disposed between the protected node and the bus, and to act as a dedicated proxy for the protected node, the bus-off prevention circuitry to:
   detect a transmitted message from the protected node to the bus;
   store the transmitted message in the memory device;
   detect a bit mismatch of the transmitted message on the bus;
   suspend further transmissions from the protected node while the bus is analyzed;
   determine whether the bit mismatch represents a bus fault or an active attack against the protected node;
   signal the protected node indicating whether a fault has occurred;
   in response to the determination that the bit mismatch represents the bus fault, delete the transmitted message from the memory device; and
   in response to the determination that the bit mismatch represents the active attack, retransmit the transmitted message from the memory device to the bus at a later time.

2. The electronic device of claim 1, wherein the bus-off prevention circuitry is incorporated into the protected node.

3. The electronic device of claim 1, wherein the bus-off prevention circuitry is separately packaged from the protected node.

4. The electronic device of claim 1, wherein to suspend further transmission from the protected node, the bus-off prevention circuitry is to:
   use a bypass channel to transmit the transmitted message back to the protected node.

5. The electronic device of claim 1, wherein to suspend further transmission from the protected node, the bus-off prevention circuitry is to:
   use a bypass channel to transmit an altered message back to the protected node, the altered message including a bit flipped from the transmitted message.

6. The electronic device of claim 1, wherein to suspend further transmission from the protected node, the bus-off prevention circuitry is to:
   use a bypass channel to transmit a high-priority message back to the protected node, the high-priority message indicating that the bus is busy.

7. The electronic device of claim 1, wherein to determine whether the bit mismatch represents the bus fault or the active attack against the protected node, the bus-off prevention circuitry is to:
   store the transmitted message in a memory device;
   receive a sensed message from the bus;
   compare the transmitted message to the sensed message to identify a multi-bit mismatch between the transmitted message and the sensed message; and
   identify the multi-bit mismatch as the bus fault or active attack.

8. The electronic device of claim 1, wherein the memory device is configured as a first-in first-out queue and wherein the bus-off prevention circuitry is to:
   store multiple transmitted messages in the memory device; and
   delete or transmit the stored multiple transmitted messages depending on whether the bit mismatch represents the bus fault or active attack, respectively.

9. The electronic device of claim 1, wherein to determine whether the bit mismatch represents the bus fault or the active attack against the protected node, the bus-off prevention circuitry is to:
   monitor bus activity on the bus for signaling that represents six bits; identify the bit mismatch as the bus fault when the six bits all represent a recessive state; and
   identify the bit mismatch as the active attack when the six bits are not all in the recessive state.

10. The electronic device of claim 1, wherein the bus-off prevention circuitry is to:
    identify a message from an attacker node participating in the active attack;
    corrupt the message from the attacker node to produce a corrupted message; and
    broadcast the corrupted message on the bus.

11. A method for bus-off attack detection and prevention, the method performed by bus-off prevention circuitry coupled to a protected node on a bus, the method comprising:
    detecting a transmitted message from the protected node to the bus;
    storing the transmitted message in a memory device of the bus-off prevention circuitry;
    detecting a bit mismatch of the transmitted message on the bus;
    suspending further transmissions from the protected node while the bus is analyzed;
    determining whether the bit mismatch represents a bus fault or an active attack against the protected node;
    signaling the protected node indicating whether a fault has occurred;
    in response to the determination that the bit mismatch represents the bus fault, deleting the transmitted message from the memory device; and
    in response to the determination that the bit mismatch represents the active attack, retransmitting the transmitted message from the memory device to the bus at a later time;
    wherein the bus-off prevention circuitry disposed between the protected node and the bus, and to act as a dedicated proxy for the protected node.

12. The method of claim 11, wherein the bus-off prevention circuitry is incorporated into the protected node.

13. The method of claim 11, wherein the bus-off prevention circuitry is separately packaged from the protected node.

14. The method of claim 11, wherein suspending further transmission from the protected node comprises using a bypass channel to transmit the transmitted message back to the protected node.

15. The method of claim 11, wherein suspending further transmission from the protected node comprises using a bypass channel to transmit an altered message back to the protected node, the altered message including a bit flipped from the transmitted message.

16. The method of claim 11, wherein suspending further transmission from the protected node comprises using a bypass channel to transmit a high-priority message back to the protected node, the high-priority message indicating that the bus is busy.

17. The method of claim 11, wherein determining whether the bit mismatch represents the bus fault or the active attack against the protected node comprises:
storing the transmitted message in a memory device;
receiving a sensed message from the bus;
comparing the transmitted message to the sensed message to identify a multi-bit mismatch between the transmitted message and the sensed message; and
identifying the multi-bit mismatch as the bus fault or active attack.

18. The method of claim 11, wherein the memory device is configured as a first-in first-out queue and wherein the method comprises:
storing multiple transmitted messages in the memory device; and
deleting or transmit the stored multiple transmitted messages depending on whether the bit mismatch represents the bus fault or active attack, respectively.

19. The method of claim 11, wherein determining whether the bit mismatch represents the bus fault or the active attack against the protected node comprises:
monitoring bus activity on the bus for signaling that represents six bits;
identifying the bit mismatch as the bus fault when the six bits all represent a recessive state; and
identifying the bit mismatch as the active attack when the six bits are not all in the recessive state.

20. The method of claim 11, further comprising:
identifying a message from an attacker node participating in the active attack;
corrupting the message from the attacker node to produce a corrupted message; and
broadcasting the corrupted message on the bus.

21. At least one non-transitory machine-readable medium including instructions for bus-off attack detection and prevention, the instructions when executed by bus-off prevention circuitry coupled to a protected node on a bus, cause the bus-off prevention circuitry to perform operations comprising:
detecting a transmitted message from the protected node to the bus;
storing the transmitted message in a memory device of the bus-off prevention circuitry;
detecting a bit mismatch of the transmitted message on the bus;
suspending further transmissions from the protected node while the bus is analyzed;
determining whether the bit mismatch represents a bus fault or an active attack against the protected node;
signaling the protected node indicating whether a fault has occurred;
in response to the determination that the bit mismatch represents the bus fault, deleting the transmitted message from the memory device; and
in response to the determination that the bit mismatch represents the active attack, retransmitting the transmitted message from the memory device to the bus at a later time;
wherein the bus-off prevention circuitry disposed between the protected node and the bus, and to act as a dedicated proxy for the protected node.

22. The at least one non-transitory machine-readable medium of claim 21, wherein determining whether the bit mismatch represents the bus fault or the active attack against the protected node comprises:
storing the transmitted message in a memory device;
receiving a sensed message from the bus;
comparing the transmitted message to the sensed message to identify a multi-bit mismatch between the transmitted message and the sensed message; and
identifying the multi-bit mismatch as the bus fault or active attack.

23. The at least one non-transitory machine-readable medium of claim 21, wherein the memory device is configured as a first-in first-out queue and wherein the operations comprise:
storing multiple transmitted messages in the memory device; and
deleting or transmitting the stored multiple transmitted messages depending on whether the bit mismatch represents the bus fault or active attack, respectively.

* * * * *